United States Patent
Cho

(10) Patent No.: US 8,754,877 B2
(45) Date of Patent: Jun. 17, 2014

(54) LIQUID CRYSTAL PANEL UNIT, DISPLAY DEVICE, AND METHOD OF MANUFACTURING THE SAME

(75) Inventor: Heung-Su Cho, Asan-si (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 695 days.

(21) Appl. No.: 12/243,336

(22) Filed: Oct. 1, 2008

(65) Prior Publication Data

US 2009/0189833 A1 Jul. 30, 2009

(30) Foreign Application Priority Data

Jan. 25, 2008 (KR) .................. 10-2008-0008134

(51) Int. Cl.
*G06F 3/038* (2013.01)
*G09G 5/00* (2006.01)
*H01L 21/00* (2006.01)

(52) U.S. Cl.
USPC .............................. 345/205; 345/204; 438/30

(58) Field of Classification Search
CPC . G09G 3/3611; G09G 3/3674; G09G 3/3695; G09G 3/3696
USPC ............. 345/60, 84, 87–90, 204–205; 438/30
See application file for complete search history.

(56) References Cited

U.S. PATENT DOCUMENTS

| | | | | |
|---|---|---|---|---|
| 6,052,171 A | * | 4/2000 | Kawaguchi | 349/149 |
| 6,380,918 B1 | * | 4/2002 | Chiba et al. | 345/90 |
| 7,279,982 B1 | * | 10/2007 | Zhou et al. | 330/301 |
| 2003/0117353 A1 | * | 6/2003 | Moon | 345/87 |
| 2004/0108985 A1 | * | 6/2004 | Song | 345/87 |
| 2007/0126721 A1 | * | 6/2007 | Kurokawa | 345/204 |
| 2007/0211009 A1 | * | 9/2007 | Teranishi | 345/98 |

FOREIGN PATENT DOCUMENTS

| | | |
|---|---|---|
| CN | 1506720 | 6/2004 |
| CN | 1584719 | 2/2005 |
| CN | 1737656 | 2/2006 |
| CN | 101000413 | 7/2007 |
| CN | 101110578 | 1/2008 |

(Continued)

OTHER PUBLICATIONS

English Abstract for Publication No. S57-060414 U, 1982.

(Continued)

*Primary Examiner* — Jonathan Horner
(74) *Attorney, Agent, or Firm* — F. Chau & Associates, LLC

(57) ABSTRACT

A liquid crystal panel unit, a display device, and a method of manufacturing the same, in which the display device includes: a display panel that includes a display region; a gate driver that applies a gate signal to the display region; a data driver that applies a data signal to the display region; a vertical synchronization signal line that transfers a vertical synchronization start signal to the gate driver; a data signal line that transfers the data signal to the data driver; and an isolation pattern that is arranged between the vertical synchronization signal line and the data signal line. The isolation pattern intercepts an electromagnetic field that is generated and prevents image degradation.

14 Claims, 3 Drawing Sheets

(56) References Cited

FOREIGN PATENT DOCUMENTS

| | | |
|---|---|---|
| JP | S57-060414 U | 4/1982 |
| JP | 06-011684 | 1/1994 |
| JP | 06-062065 | 3/1994 |
| JP | 2002-207437 | 7/2002 |
| JP | 2002-214642 | 7/2002 |
| JP | 2003-347693 | 5/2003 |
| JP | 2004-199066 | 7/2004 |
| JP | 2004-282741 | 10/2004 |
| JP | 2006-209109 | 8/2006 |
| JP | 2007-322501 | 12/2007 |
| KR | 10-2004-0050524 | 6/2004 |
| KR | 10-2008-0002562 | 1/2008 |

OTHER PUBLICATIONS

English Abstract for Publication No. 06-062065, 1994.
English Abstract for Publication No. 2002-207437.
English Abstract for Publication No. 2006-209109.
English Abstract for Publication No. 2004-199066.
English Abstract for Publication No. 2003-347693.
English Abstract for Publication No. 2002-214642.
English Abstract for Publication No. 06-011684, 1994.
English Abstract for Publication No. CN 1737656, 2006.
English Abstract for Publication No. CN 101110578, 2008.
English Abstract for Publication No. CN 101000413, 2007.
English Abstract for Publication No. 2007-322501.
English Abstract for Publication No. 2004-282741.

* cited by examiner

LIQUID CRYSTAL PANEL UNIT, DISPLAY DEVICE, AND METHOD OF MANUFACTURING THE SAME

CROSS-REFERENCE TO RELATED APPLICATION

This application claims priority to and the benefit of Korean Patent Application No. 10-2008-0008134 filed in the Korean Intellectual Property Office on Jan. 25, 2008, the entire contents of which are incorporated herein by reference.

BACKGROUND (a) Technical Field

The present disclosure relates to a liquid crystal panel unit, a display device, and a method of manufacturing the same.

(b) Discussion of Related Art

In a display device such as a liquid crystal display (LCD) or an organic light emitting display (OLED), a display panel in which each pixel is independently driven is used. The display panel has a plurality of gate lines that transfer gate signals and a plurality of data lines that transfer data voltages. The display panel further includes a plurality of thin film transistors (TFTs) that are connected to the gate lines and the data lines and a plurality of pixel electrodes that are connected to the TFTs.

In addition, the display panel includes a gate driver that turns on/off the TFTs, a data driver that applies the data voltages to the TFTs, and a signal controller that applies image signals for the data voltages to the data driver and that applies control signals to the gate driver and the data driver.

A method of transmitting the image signals from the signal controller to the data driver includes using a low-voltage differential signal (LVDS) method, a mini-LVDS method, a reduced-voltage differential signal (RVDS) method, and a low-current differential signal (LCDS) method, and in the LCDS method, the image signals are transmitted using a very low level of current. When arranging signal wires to which high voltages are applied around signal wires in which several mA of current flows, flow of the current is changed by an electromagnetic field that is generated by the high voltages, and this causes an image failure.

SUMMARY OF THE INVENTION

An exemplary embodiment of the present invention provides a display device including: a display panel that includes a display region, a gate driver that applies a gate signal to the display region, a data driver that applies a data voltage to the display region, a vertical synchronization signal line that transfers a vertical synchronization start signal to the gate driver, at least one data signal line that transfers an image signal for generating the data voltage to the data driver; and an isolation pattern that is arranged between the vertical synchronization signal line and the data signal line.

The isolation pattern may be supplied with a predetermined level of DC voltage.

In this exemplary embodiment, the isolation pattern may be connected to a ground terminal.

The display device may further include a data controller that supplies the image signal to the data driver, wherein the data controller may transmit the image signal using an LCDS method.

The vertical synchronization start signal may have a voltage level of about −20V to 30V.

The display panel may have a rectangular shape, and the data driver may include a plurality of data driving chips that are arranged on the display panel along a longitudinal side of the display panel.

The display device may further include a gate line that is formed in the display panel, wherein the gate driver may include a shift register that is connected to the gate line.

BRIEF DESCRIPTION OF THE DRAWINGS

Exemplary embodiments of the present invention will be understood in more detail from the following descriptions taken in conjunction with the accompanying drawings, wherein.

DETAILED DESCRIPTION OF EXEMPLARY EMBODIMENTS

Figure 1:
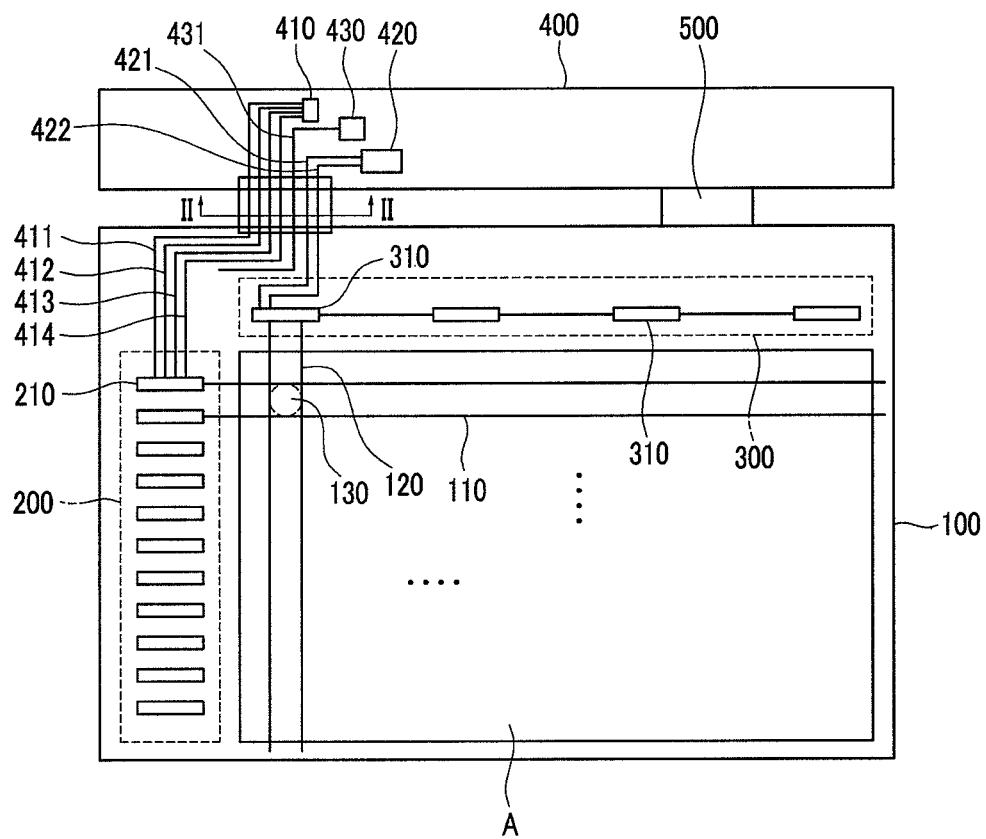
FIG. 1 is a top plan view of a display device according to an exemplary embodiment of the present invention.

In the following detailed description, exemplary embodiments of the present invention have been shown and described, simply by way of illustration. As those of ordinary skill in the art would realize, the described exemplary embodiments may be modified in various different ways, all without departing from the spirit or scope of the present invention. The description is to be regarded as illustrative in nature and not restrictive. Like reference numerals designate like elements throughout the specification and drawings.

Figure 2:
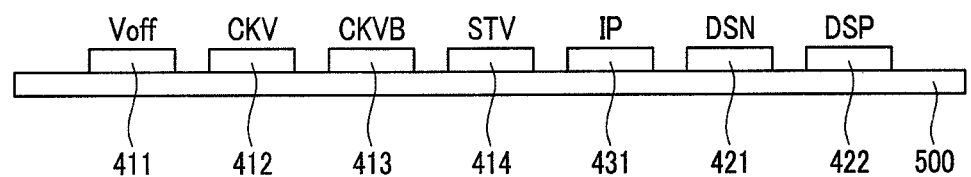
FIG. 2 is a cross-sectional view of the display device taken along a line II-II of FIG. 1.

FIG. 1 is a top plan view of a display device according to an exemplary embodiment of the present invention, and FIG. 2 is a cross-sectional view of the display device taken along a line II-II of FIG. 1. The display device may be an LCD or an OLED.

As shown in FIG. 1, the display device includes a display panel 100 that includes a display region A and has a rectangular shape, a printed circuit board (PCB) 400 that is connected to the display panel 100, and a flexible printed circuit board (FPCB) 500 that connects the display panel 100 and the PCB 400. Various driving elements for driving the display panel 100 are mounted on the PCB 400, and the driving elements include a data controller 420, a driving power source 410 that generates driving voltages by the control of the data controller 420, and a DC power source 430. In the FPCB 500, a plurality of signal lines for transferring a plurality of signals that are supplied from the PCB 400 to the display panel 100 are formed. The display panel 100, the PCB 400, and the FPCB 500 for connecting them are called a display panel unit, and when the display panel 100 includes a liquid crystal layer, the display panel 100 is defined as a liquid crystal panel and the display panel unit is defined as a liquid crystal panel unit. In the liquid crystal panel unit, a backlight unit, which is a light source, is provided in a rear surface of the liquid crystal panel.

The display panel 100 includes a gate driver 200, a data driver 300, a plurality of gate lines 110 connected to the gate driver 200, a plurality of data lines 120 connected to the data driver 300, and a plurality of pixels 130 that are defined at intersecting regions of the gate lines 110 and the data lines 120. Each of the pixels 130 includes a TFT that is not shown.

The gate lines 110 are extended to the display region A in a row direction, and the data lines 120 are extended to the display region A in a column direction and are substantially perpendicular to the gate lines 110. Further, each of the pixels 130 includes a liquid crystal capacitor Clc and a storage capacitor Cst that are connected to the TFT. The storage capacitor Cst may be omitted. Further, in order to display a color, the display panel 100 includes red, green, and blue color filters (not shown) in regions corresponding to the pixels 130.

The gate driver 200 is referred to as a scan driver and applies gate signals to the gate lines 110, each gate signal consists of a combination of a gate-on voltage Von and a gate-off voltage Voff. The gate driver 200 is embodied with a shift register that is formed on the display panel 100. The shift register includes a plurality of stages 210 that are respectively connected to each gate line 110. Each stage 210 receives a driving voltage from the driving power source 410. The driving voltages applied to the stages 210 may be different from each other. The gate driver 200 sequentially transfers a gate signal to each gate line 110, and a gate signal that is output to one gate line 110 operates as a reset signal in a front-end stage and operates as a carry signal in a rear-end stage.

The data driver 300 is referred to as a source driver, and it converts image signals that are output from the data controller 420 to analog data voltages and provides the analog data voltages to the display region A through the data lines 120. The data driver 300 includes a plurality of data driving chips 310 that are arranged along a longitudinal side of the display panel 100. Each of the data driving chips 310 is provided using a method of a chip-on-glass (COG) that is mounted on the display panel 100. According to an exemplary embodiment, the data driver 300 is mounted on the FPCB 500, rather than on the display panel 100, and may be connected to the data lines 120. The data driver 300 according to the exemplary embodiment receives image signals from the data controller 420 using an LCDS method. In the LCDS method, image signals, are transferred using a current of a very low magnitude, for example about 1 to 3 mA.

The driving power source 410 generates a gate-off voltage Voff, and various control signals for output to the gate driver 200. The driving power source 410 may generate a gate-on voltage Von for output to the gate driver 200, too. For better comprehension and ease of description, the driving power source 410 is described as a separate block from the data controller 420, but the driving power source 410 and the data controller 420 need be not physically separated. The driving power source 410 may be combined with the data controller 420, or a block for generating a gate-off voltage Voff or a block for outputting a vertical synchronization start signal STV may be separately provided. In order to transfer the gate-off voltage Voff and the control signals that are output from the driving power source 410 to the gate driver 200, a plurality of signal lines 411-414 are arranged between the driving power source 410 and the gate driver 200. Not shown in FIG. 1, a signal line for transferring the gate-on voltage Von may be formed between the driving power source 410 and the gate driver 200 via the FPCB 500. The plurality of signal lines 411-414 are extended to the display panel 100 via the PCB 400 and the FPCB 500.

As shown in FIG. 2, the plurality of signal lines 411-414 includes a gate-off voltage line 411, a clock signal line 412 to which a clock signal CKV is applied, an inversion clock signal line 413 to which a clock signal (referred to as "an inversion clock signal") CKVB inverted relative to the clock signal CKV is applied, and a vertical synchronization signal line 414 to which a vertical synchronization start signal STV is applied. Additional signal lines for transferring control signals, however, may further be formed between the driving power source 410 and the gate driver 200, unlike what is shown in FIG. 2. The vertical synchronization start signal STV that is output to the vertical synchronization signal line 414 is a signal that notifies the start of one frame. The vertical synchronization start signal STV is output once per frame, and the amplitude thereof may be a voltage level of several to several tens of volts, for example, about 0V to 50V. In this exemplary embodiment, an absolute voltage level of the vertical synchronization start signal STV may have a value between about −20V to 30V. According to a size or resolution of the display panel 100, the voltage level of the vertical synchronization start signal STV may be changed. The signal lines 411, 412, 413, and 414 are arranged parallel to each other and are also parallel to data signal lines 421 and 422 to be described hereinbelow.

The data controller 420 is a control block that is called a signal controller. The data controller 420 outputs various control signals to the data driver 300, processes image signals that are input from the outside, and outputs the processed image signals to the data driver 300. Furthermore, the data controller 420 outputs a load signal for instructing to apply data voltages corresponding to the image signals to the data lines 120, an inversion control signal that inverts the polarity of the data voltages, and a horizontal clock signal to the data driver 300. The data controller 420 applies image signals to the data driving chip 310 through a negative data signal line 421 and a positive data signal line 422. The data controller 420 may also apply the image signals to the first data driving chip 310, and then the image signals are sequentially shifted from the first data driving chip 310 such that all the data driving chips 310 may be supplied with the corresponding image signals. The image signals have positive polarity or negative polarity for a common voltage, and alternate between them. An image signal DS.N having a low level relative to a common voltage is applied to the negative data signal line 421, and an image signal DS.P having a high level relative to the common voltage is applied to the positive data signal line 422. As described above, because the image signals are transmitted using an LCDS method, a minute current flows in the data signal lines 421 and 422 and the current is easily influenced by an external electromagnetic field.

An isolation pattern IP 431 is connected to the DC power source 430 and is formed parallel to two signal lines 414 and 421 between the vertical synchronization signal line 414 and the negative data signal line 421. The isolation pattern 431 intercepts an electromagnetic field generated by a vertical synchronization start signal STV that is applied to the vertical synchronization signal line 414 and prevents an interference phenomenon from being generated by a vertical synchronization start signal STV. As described above, because the amplitude of the vertical synchronization start signal STV has a very high value of several to several tens of volts, an electromagnetic field is generated around the vertical synchronization signal line 414, and a current that is influenced by the electromagnetic field causes an image failure on the display panel 100. The isolation pattern 431 performs a function of isolating the data signal lines 421 and 422 from an influence of the vertical synchronization signal line 414 and of canceling the generated electromagnetic field. For this purpose, a predetermined level of DC voltage that is output from the DC power source 430 is applied to the isolation pattern 431. Because no voltage is applied to the isolation pattern 431, if the isolation pattern 431 is sustained in a floating state, an electromagnetic field generating by the vertical synchronization start signal STV is induced to the isolation pattern 431, and the data signal lines 421 and 422 may be influenced by the electromagnetic field that is induced to the isolation pattern 431. Therefore, it is preferable that the predetermined level of voltage is applied to the isolation pattern 431.

The isolation pattern 431 is not limited to being arranged between the vertical synchronization signal line 414 and the negative data signal line 421, and may be formed between the data signal lines 421 and 422 that transmit image signals using an LCDS method and at least one signal line (not shown) that is arranged adjacent the data signal lines 421 and 422. If the gate-off voltage line 411 is arranged adjacent the data signal lines 421 and 422, the isolation pattern 431 may be arranged between the gate-off voltage line 411 and the data signal lines 421 and 422. This is because, although a gate-off voltage Voff has a predetermined level and is not a pulse, an electromagnetic field may be formed by a ripple component that may be generated in the gate-off voltage Voff.

The isolation pattern 431 may be formed with a signal line of an identical material and at the same layer as that of other signal lines, and should be fully provided up to a portion where the data signal lines 421 and 422 and the vertical synchronization signal line 414 are extended in parallel.

The isolation pattern 431 is formed in a portion at which the gate driver 200 and the data driver 300 are adjacently provided, that is, a portion at which a signal that is output to the gate driver 200 and a signal that is output to the data driver 300 may interfere with each other.

Figure 3:
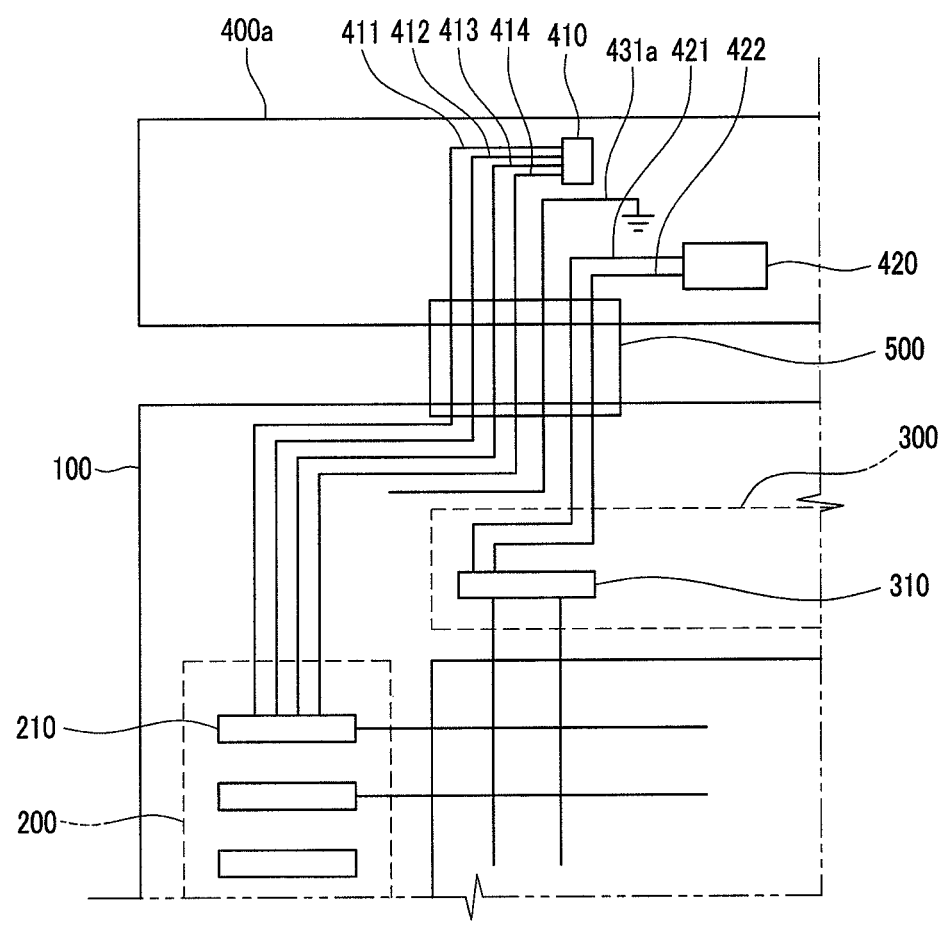
FIG. 3 is a partial top plan view of a display device according to an exemplary embodiment of the present invention.

Referring to FIG. 3, an exemplary embodiment of the present invention will be described.

FIG. 3 is a partial top plan view of a display device according to an exemplary embodiment of the present invention.

As shown in FIG. 3, the isolation pattern 431a is not connected to a DC power source 430 but is connected to a ground terminal. Except for the isolation pattern 431a, because a structure of a display panel 100 and the PCB 400a of the display device according to the exemplary embodiment is the same as that of display device shown in FIG. 1, elements performing the same operations are indicated by the same reference numerals, and the detailed description thereof is omitted. Thereby, it is characterized in that the level of DC voltage that is applied to the isolation pattern 431a is a ground level. The fixed DC voltage of the ground level is sustained in the isolation pattern 431a, and this performs the function of intercepting an electromagnetic field generated by a pulse of a vertical synchronization start signal STV.

A manufacturing method of the display device according to the exemplary embodiments of the present invention will be described with reference to FIG. 4.

Figure 4:
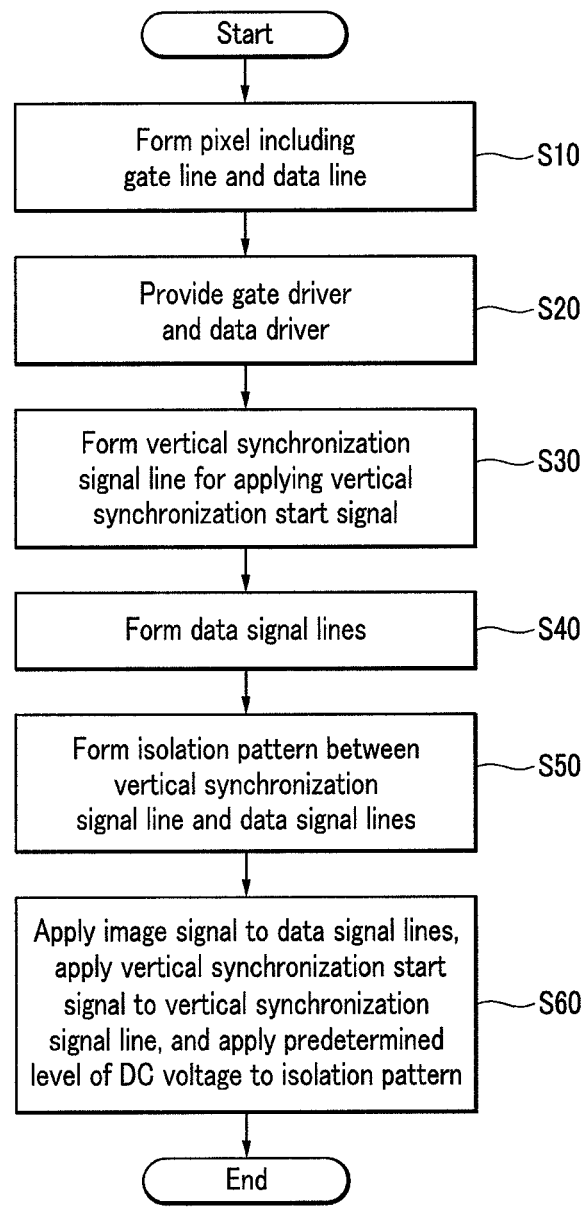
FIG. 4 is a flowchart illustrating a method of manufacturing a display device according to exemplary embodiments of the present invention.

FIG. 4 is a flowchart illustrating a method of manufacturing a display device according to exemplary embodiments of the present invention as shown in FIGS. 1 and 3, for example.

As shown in FIG. 4, the pixels 130 including the gate lines 110 and the data lines 120 are formed in the display panel 100 (S10). The gate lines 110 and the data lines 120 are formed by a known technology of forming a metal wire in an insulation substrate.

Thereafter, a shift register, that is, the gate driver 200 that is connected to the gate lines 110, is formed, and the data driver 300 that is connected to the data lines 120 is formed (S20). In exemplary embodiments of the present invention, both the gate driver 200 and the data driver 300 are mounted or formed in the display panel 100.

The PCB 400 or 400a for applying various signals to the display panel 100 is connected by the display panel 100 via the FPCB 500.

The vertical synchronization signal line 414 for applying a vertical synchronization start signal STV is connected to the gate driver 200 via the PCB 400 or 400a and the FPCB 500 (S30), and data signal lines 421 and 422 for applying image signals are connected to the data driver 300 via the PCB 400 or 400a and the FPCB 500 (S40).

Thereafter, the isolation pattern 431 or 431a for intercepting an electric field generated by the vertical synchronization start signal STV is formed between the vertical synchronization signal line 414 and the data signal lines 421 and 422 (S50). The isolation pattern 431 or 431a is also formed with a metal wire identical to that of the other signal lines via the PCB 400 and the FPCB 500.

Finally, image signals are applied to the data signal lines 421 and 422, the vertical synchronization start signal STV is applied to the vertical synchronization signal line 414, and a predetermined level of DC voltage is applied to the isolation pattern 431 or 431a (S60). The level of the DC voltage may be adjusted according to the level of the image signals or the vertical synchronization start signal STV, and may even be at a ground level.

As described above, according to exemplary embodiments of the present invention, a liquid crystal panel unit in which an electromagnetic field is intercepted, a display device, and a method of manufacturing the same are provided.

In addition, according to exemplary embodiments of the present invention, a liquid crystal panel unit in which an image failure is reduced, a display device, and a method of manufacturing the same are provided.

While this invention has been described in connection with what is presently considered to be practical exemplary embodiments, it is to be understood that the invention is not limited to the disclosed exemplary embodiments, but, on the contrary, is intended to cover various modifications and equivalent arrangements included within the spirit and scope of the appended claims.

What is claimed is:

1. A display device comprising:
    a display panel that includes a display region;
    a gate driver that applies a gate signal to the display region;
    a data driver that applies a data voltage to the display region;
    a printed circuit board (PCB) that outputs the gate signals to the gate driver and image signals for generating the data voltages to the data driver;
    a flexible printed circuit board (FPCB) that connects the PCB and the display panel;
    a vertical synchronization signal line formed on the PCB and the FPCB, and that transfers a vertical synchronization start signal to the gate driver;
    a pair of data signal lines formed on the PCB and the FPCB, and that transfer an image signal for generating the data voltage to the data driver, the pair of data signal lines comprising:
        a negative data signal line for low data levels relative to a common voltage; and
        a positive data signal line for high data levels relative to the common voltage; and
    an isolation pattern formed on the PCB and the FPCB, and that is arranged between the vertical synchronization signal line and the pair of data signal lines to intercept an electromagnetic field generated by the vertical synchronization signal line,
    wherein the isolation pattern is at a same layer as the vertical synchronization line and the pair of data signal lines and is supplied with a predetermined level of DC voltage.

2. The display device of claim 1, further comprising a data controller that supplies the image signal to the data driver, wherein the data controller transmits the image signal using a low-current differential signal method.

3. The display device of claim 2, wherein the vertical synchronization start signal has a voltage level of about −20V to 30V.

4. The display device of claim 1,
wherein the display panel has a rectangular shape, and
the data driver comprises a plurality of data driving chips that are arranged on the display panel along a longitudinal side of the display panel.

5. The display device of claim 1, further comprising a gate line that is formed in the display panel,
wherein the gate driver comprises a shift register that is connected to the gate line.

6. A liquid crystal panel unit comprising:
a liquid crystal panel in which a plurality of pixels are formed;
a gate driver that is arranged on the liquid crystal panel along a lateral side of the liquid crystal panel and that applies gate signals to the pixels;
a data driver that is arranged on the liquid crystal panel along a longitudinal side of the liquid crystal panel and that applies data voltages to the pixels;
a printed circuit board (PCB) that outputs the gate signals to the gate driver and image signals for generating the data voltages to the data driver;
a flexible printed circuit board (FPCB) that connects the PCB and the liquid crystal panel;
a vertical synchronization signal line fowled on the PCB and the FPCB, and that is connected to the gate driver via the PCB and the FPCB;
a pair of data signal lines formed on the PCB and the FPCB, and that are connected to the data driver via the PCB and the FPCB, the pair of data signal lines comprising:
a negative data signal line for low data levels relative to a common voltage; and
a positive data signal line for high data levels relative to the common voltage; and
an isolation pattern formed on the PCB and the FPCB, and that is arranged between the vertical synchronization signal line and the pair of data signal lines via the PCB and the FPCB to intercept an electromagnetic field generated by the vertical synchronization signal line,
wherein the isolation pattern is at a same layer as the vertical synchronization line and the pair of data signal lines and is supplied with a predetermined level of DC voltage.

7. The liquid crystal panel unit of claim 6, further comprising a data controller that supplies the image signals to the data driver,
wherein the data controller transmits the image signals using a low-current differential signal (LCDS) method.

8. The liquid crystal panel unit of claim 6, wherein the vertical synchronization start signal has a voltage level of about −20 V to 30V.

9. A method of manufacturing a display device, comprising:
forming a pixel having a gate signal and a data signal;
providing a gate driver that applies a gate signal and a data driver that applies a data voltage to the pixel;
providing a printed circuit board (PCB) that outputs the gate signals to the gate driver and image signals for generating the data voltages to the data driver;
connecting the PCB and the gate driver and the data driver through a flexible printed circuit board (FPCB);
forming a vertical synchronization signal line on the PCB and the FPCB for applying a vertical synchronization start signal to the gate driver;
forming a pair of data signal lines on the PCB and the FPCB for applying an image signal for generating the data voltage to the data driver, the pair of data signal lines comprising:
a negative data signal line for low data levels relative to a common voltage; and
a positive data signal line for high data levels relative to the common voltage; and
forming an isolation pattern on the PCB and the FPCB between the vertical synchronization signal line and the pair of data signal lines to intercept an electromagnetic field generated by the vertical synchronization signal line,
wherein the isolation pattern is at a same layer as the vertical synchronization line and the pair of data signal lines and is supplied with a predetermined level of DC voltage.

10. The method of claim 9, further comprising transmitting the image signal to the data signal line using an LCDS method.

11. The method of claim 9, wherein the vertical synchronization start signal has a voltage level of about −20V to 30V.

12. The display device of claim 1, wherein the negative data signal line is adjacent the isolation pattern and the positive data signal line is adjacent the negative data signal line.

13. The liquid crystal panel unit of claim 6, wherein the negative data signal line is adjacent the isolation pattern and the positive data signal line is adjacent the negative data signal line.

14. The method of claim 9, wherein the negative data signal line is adjacent the isolation pattern and the positive data signal line is adjacent the negative data signal line.

* * * * *